(12) United States Patent
Khanka et al.

(10) Patent No.: US 8,406,768 B1
(45) Date of Patent: Mar. 26, 2013

(54) METHOD AND SYSTEM FOR MAINTAINING A REVERSE-ACTIVE SET THAT DEFINES WHICH SECTORS RECEIVE REVERSE-LINK SIGNALS

(75) Inventors: Bhagwan Khanka, Lenexa, KS (US); Anoop K. Goyal, Overland Park, KS (US); Hemanth Balaji Pawar, Herndon, VA (US); Shilpa Kowdley Srinivas, Herndon, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 428 days.

(21) Appl. No.: 12/250,007

(22) Filed: Oct. 13, 2008

(51) Int. Cl.
*H04W 36/00* (2009.01)

(52) U.S. Cl. ........ 455/439; 455/434; 455/436; 455/442; 455/452.2

(58) Field of Classification Search ................. None
See application file for complete search history.

(56) References Cited

U.S. PATENT DOCUMENTS

| | | | |
|---|---|---|---|
| 5,864,760 A | 1/1999 | Gilhousen et al. | |
| 6,157,668 A | 12/2000 | Gilhousen et al. | |
| 6,381,458 B1 | 4/2002 | Frodigh et al. | |
| 6,539,236 B2 | 3/2003 | Hakkinen et al. | |
| 6,590,879 B1 * | 7/2003 | Huang et al. | 370/331 |
| 6,633,554 B1 | 10/2003 | Dalal | |
| 6,788,940 B2 | 9/2004 | Bhatoolaul et al. | |
| 6,993,341 B2 | 1/2006 | Hunzinger | |
| 7,194,281 B2 | 3/2007 | Peng et al. | |
| 7,292,856 B2 | 11/2007 | Julian et al. | |
| 2005/0073975 A1 | 4/2005 | Chen et al. | |
| 2006/0068717 A1 * | 3/2006 | Gandhi et al. | 455/67.13 |
| 2007/0161389 A1 * | 7/2007 | Khandekar | 455/517 |
| 2007/0201407 A1 * | 8/2007 | Borran et al. | 370/335 |
| 2007/0287462 A1 * | 12/2007 | Gorokhov et al. | 455/439 |
| 2008/0139130 A1 | 6/2008 | Zhao et al. | |
| 2008/0165969 A1 * | 7/2008 | Khandekar et al. | 380/270 |

* cited by examiner

*Primary Examiner* — Rafael Pérez-Gutiérrez
*Assistant Examiner* — Suhail Khan

(57) ABSTRACT

A mobile station receives forward link signals and transmits reverse link signals for a communication session conducted via a wireless network. A controller maintains a reverse-active set that defines which sectors of the wireless network are used to receive the reverse link signals. When the mobile station transmits a request signal requesting the communication session, the controller may create the reverse-active set to include the sector that received the request signal with the highest signal strength. During the communication session, the signal strengths of the reverse link signals may be monitored in each of a plurality of sectors to obtain reverse-link signal strengths. The controller may maintain the reverse-active set based on the reverse-link signal strengths, adding sectors that report reverse-link signal strengths greater than an add threshold and dropping sectors that report reverse-link signal strengths less than a drop threshold.

10 Claims, 5 Drawing Sheets

METHOD AND SYSTEM FOR MAINTAINING A REVERSE-ACTIVE SET THAT DEFINES WHICH SECTORS RECEIVE REVERSE-LINK SIGNALS

BACKGROUND

For certain types of wireless communication, such as wireless communication that uses code division multiple access (CDMA), a mobile station may able to communicate with more than one sector of a wireless network for a communication session. For example, a mobile station may maintain an "active set" that identifies one or more sectors that the mobile station is currently using for a communication session. The mobile station may receive forward link signals for the communication session from the one or more sectors in the active set, and the same one or more sectors may receive the mobile station's reverse link signals for the communication session.

The active set may also change during a communication session. In a conventional "mobile assisted soft handoff procedure," the mobile station measures the strengths of pilot signals transmitted by the sector(s) in the active set and the sector(s) in a "neighbor set." If the pilot signal strength of a neighbor-set sector exceeds an add threshold, the mobile station may report this to the wireless network, e.g., by transmitting a Pilot Strength Measurement Message (PSMM), and the wireless network may instruct the mobile station to add the sector to its active set. The mobile station would then begin receiving forward link signals from the new active-set sector, and the new active-set sector would begin receiving the mobile station's reverse link signals. Conversely, if the pilot signal strength of an active-set sector falls below a drop threshold, the mobile station may report this to the wireless network (e.g., in a PSMM), and the wireless network may instruct the mobile station to drop the sector from its active set. The mobile station would then stop receiving forward link signals from the dropped sector, and the dropped sector would stop receiving the mobile station's reverse link signals.

OVERVIEW

In a first principal aspect, an exemplary embodiment provides a method for wireless communication between a wireless network and a mobile station. A request signal wirelessly transmitted by the mobile station is received in a plurality of sectors of the wireless network. The request signal requests establishment of a communication session. For each sector in the plurality of sectors, a respective received signal strength of the request signal is determined. A reverse-active sector is selected from among the plurality of sectors based, at least in part, on the reverse-active sector's received signal strength of the request signal. The mobile station is instructed to receive forward link signals from a forward-active sector for the communication session. The reverse-active sector is instructed to receive reverse link signals from the mobile station for the communication session.

In a second principal aspect, an exemplary embodiment provides a method for conducting a communication session between a mobile station and an endpoint via a wireless network, wherein the mobile station conveys mobile station communications by transmitting reverse link signals and the wireless network conveys endpoint communications by transmitting forward link signals. Signal strengths of the reverse link signals are monitored in each of the plurality of sectors during the communication session, to obtain reverse-link signal strengths. A reverse-active set of one or more reverse-active sectors is maintained based on the reverse-link signal strengths. The reverse-active set defines which one or more sectors are used to receive reverse link signals from the mobile station for the communication session.

In a second principal aspect, an exemplary embodiment provides a system for a wireless network, the wireless network having a plurality of sectors. The system comprises: (i) a plurality of base transceiver stations (BTSs) for transmitting forward link signals to and receiving reverse link signals from mobile stations during communications, each BTS being associated with at least one sector; and (ii) a controller, communicatively coupled to the BTSs, for maintaining reverse-active sets for the communication sessions, wherein each respective reverse-active set defines which one or more sectors of the wireless network are used to receive reverse link signals from a respective mobile station for a respective communication session.

DETAILED DESCRIPTION OF EXEMPLARY EMBODIMENTS

1. Introduction

Figure 1:
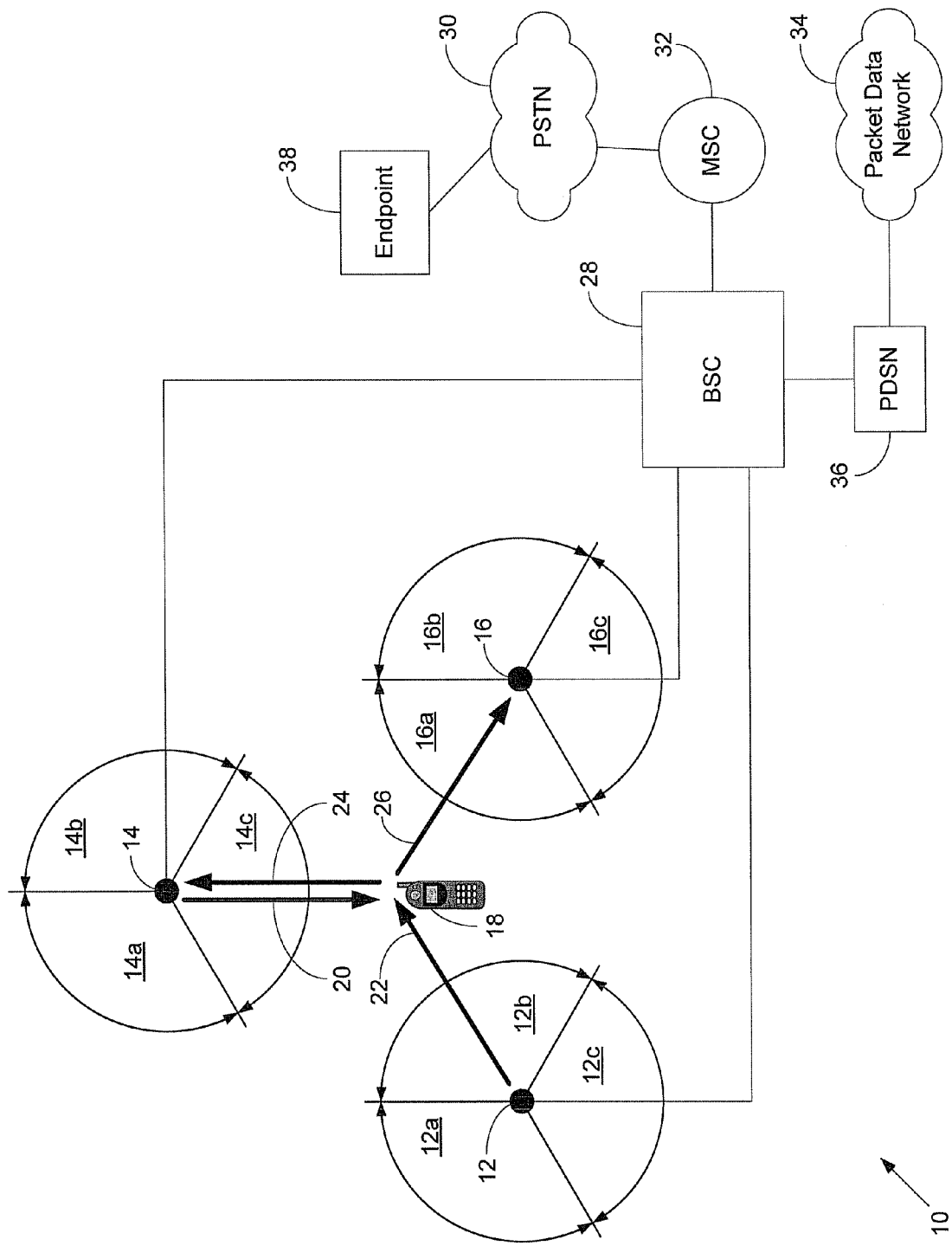
FIG. 1 is a block diagram of a wireless network, in accordance with an exemplary embodiment.

The inventors have recognized that the conventional approach in which the same one or more sectors are used for both the forward link and the reverse link for a communication session is not always ideal. For example, the forward link and reverse link can experience different conditions. As a result, the best sector for transmitting forward link signals to a mobile station is not necessarily the best sector for receiving reverse link signals from the mobile station. In view of this shortcoming, the inventors propose an approach in which the sectors used to receive reverse link signals for a communication session are managed differently than the sectors used to transmit forward link signals for that communication session.

In an exemplary embodiment, a mobile station may maintain an "active set" of one or more sectors for a communication session (e.g., using mobile assisted soft handoff procedures). However, the mobile station's active set would define the sectors used to transmit forward link signals to the mobile station for a communication session, but not the sectors used to receive reverse link signals from the mobile station. Thus, the mobile station's active set could be described as a "forward-active set" that identifies one or more "forward-active sectors." To manage the reverse link, a controller in the wireless network, such as a base station controller (BSC), may maintain a "reverse-active set" that defines which one or more sectors of the wireless network are used to receive the mobile station's reverse link signals for the communication session.

The reverse-active set for a communication session could overlap the forward-active set for the communication session either partially, completely, or not at all. For example, if a forward-active set identifies sectors A and B, the corresponding reverse-active set could identify the same sectors A and B (complete overlap), sectors B and C (partial overlap), or sectors C and D (no overlap). In some cases, the reverse-active set may contain the same number of sectors as in the forward-active set. Alternatively, the reverse-active set could contain either a greater or a fewer number of sectors as in the forward-active set.

The controller may maintain the reverse-active set for a communication session based on signal strengths of reverse link signals that are measured in a plurality of relevant sectors. The relevant sectors may include, for example, the one or more sectors currently in the reverse-active set, as well as one or more neighboring sectors. The controller may use an "add threshold" to determine when to add a sector to the reverse-active set and a "drop threshold" to determine when to drop a sector from the reverse-active set. Thus, when a sector not in the reverse-active set reports a reverse-link signal strength that exceeds the add threshold, the controller may add that sector to the reverse-active set. When a sector in the reverse-active set reports a reverse-link signal strength that is below the drop threshold, the controller may drop that sector from the reverse-active set. It is to be understood that the add and drop thresholds used by the controller for the reverse-active set may be different from the add and drop threshold used by the mobile station for the forward-active set.

The controller may populate a reverse-active set when a mobile station transmits a request signal (e.g., an access probe) that requests establishment of a communication session. The request signal may be received in a plurality of receiving sectors. Each receiving sector may measure a received signal strength of the request signal and report the received signal strength to the controller. The controller may then select a reverse-active set of one or more sectors based, at least in part, on the received signal strengths reported by the receiving sectors. For example, the controller may designate the one or more receiving sectors that reported the highest received signal strengths as reverse-active sectors in a reverse-active set. In addition to received signal strengths, the controller may take other factors into account when selecting one or more receiving sectors for the reverse-active set. For example, the controller may take into account the availability of reverse link resources in the receiving sectors.

By providing a reverse-active set that is separate from a forward-active set, the sectors used to receive the reverse link signals for a communication session can be managed differently and independently from the sectors used to receive the forward link signals for the communication session, thereby facilitating a more efficient usage of wireless resources.

2. Exemplary Network Architecture

FIG. 1 illustrates an exemplary wireless network 10 in which exemplary embodiments may be employed. Wireless network 10 includes a plurality of base transceiver stations (BTSs), exemplified in FIG. 1 by BTSs 12, 14, and 16. Each BTS may be able to wirelessly communicate with mobile stations, such as mobile station 18. Mobile station 18 could be a wireless telephone, wireless personal digital assistant, wireless e-mail device, wirelessly-equipped laptop computer, or other wireless communication device.

Each BTS may include directional antennas to define a plurality of sectors. For example, BTS 12 may define sectors 12*a*, 12*b*, and 12*c*, BTS 14 may define sectors 14*a*, 14*b*, and 14*c*, and BTS 16 may define sectors 16*a*, 16*b*, and 16*c*. Although FIG. 1 shows each BTS with three sectors, it is to be understood that a BTS could have a greater or fewer number of sectors. Moreover, it is to be understood that the illustration of sectors in FIG. 1 is schematic only, as FIG. 1 is not intended to illustrate the precise geographic area covered by any sector.

In an exemplary embodiment, the wireless communications between the BTSs and the mobile station use a code division multiple access (CDMA) air interface, such as 1xRTT or EVDO. Although FIG. 1 is described herein with respect to CDMA, it is to be understood that CDMA is exemplary only. Other protocols, such as IEEE 802.11 (WiFi), IEEE 802.16 (WiMax), or GSM/GPRS could be used.

In the CDMA case, each sector may be identified by a distinct pseudonoise (PN) code offset. Thus, the signals transmitted by each sector may be spread spectrum signals that are spread by a PN code with the sector's particular offset. Each sector may have available to it a number of forward channels for transmitting forward link signals, with each of the forward channels being identified by a distinct Walsh code. The forward channels may include a plurality of control channels, such as a pilot channel, a sync channel, and one or more paging channels. The forward channels may also include a plurality of forward traffic channels. The forward traffic channels may be used to transmit forward link signals for communication sessions.

Each sector may also be able to receive up to a certain number of reverse link channels. The reverse link channels may include access channels and reverse traffic channels. A mobile station may transmit a reverse link signal in an access channel in order to request access to the wireless network, for example, to request establishment of a communication session. The reverse link signal may take the form of an access probe.

Once access is granted, the mobile station may then transmit a reverse link signal in a reverse traffic channel in order to convey the mobile station's communications for a communication session. The reverse traffic channel may be identified by a user-specific PN code. The user-specific PN code could be, for example, a code that the mobile station generates based on its electronic serial number (ESN). Thus, a reverse link signal corresponding to a reverse link traffic channel may be a spread spectrum signal that is spread by a PN code that is specific to the mobile station that transmitted it.

More than one sector may be used to transmit signals to and/or receive signals from a mobile station. For example, FIG. 1 shows mobile station 18 with four wireless communication links: forward link 20 transmitted by sector 14*c* and received by mobile station 18; forward link 22 transmitted by sector 12*b* and received by mobile station 18; reverse link 24 transmitted by mobile station 18 and received by sector 14*c*; and reverse link 26 transmitted by mobile station 18 and received by sector 16*a*. Reverse link 24 and reverse link 26 may represent the same reverse link signal that is received by two different sectors. Alternatively, reverse links 24 and 26 may represent different reverse link signals transmitted by mobile station 18.

Although FIG. 1 shows mobile station 18 using four wireless communication links, it is to be understood that a mobile station may use a greater or fewer number of wireless communication links. In particular, mobile station 18 may use a greater or fewer number of forward links and/or a greater or fewer number of reverse links. In addition, although FIG. 1 shows mobile station 18 communicating with sectors of different BTSs, it is to be understood that a mobile station may also communicate with different sectors of the same BTS.

BTSs 12, 14, and 16 may be controlled by a base station controller (BSC) 28. BSC 28 may control the use of forward and reverse traffic channels for wireless communication between BTSs 12, 14, and 16 and mobile stations, such as mobile station 18. More particularly, BSC 28 may maintain reverse-active sets for communication sessions involving wireless network 10. As described in more detail below, each respective reverse-active set may define which one or more sectors of wireless network 10 are used to receive reverse link signals from a respective mobile station for a respective communication session. Although FIG. 1 shows three BTSs (BTS 12, 14, and 16) and nine sectors (sectors 12*a-c*, 14*a-c*, and 16*a-c*) in the service area of BSC 28, it is to be understood that a BSC could have a greater or fewer number of BTSs and/or sectors in its service area.

BSC 28 may be communicatively coupled to a circuit-switched network, such as public switched telephone network 30, e.g., via a mobile switching center 32. BSC 28 may also be communicatively coupled to a packet-switched network, such as packet data network 34, e.g., via a packet data serving node (PDSN) 36. Mobile stations, such as mobile station 18, may engage in communication sessions with various endpoints via PSTN 30 or packet data network 34, in order to exchange voice, data, or other media. An endpoint could be, for example, another mobile station, a landline station, an e-mail server, a Web server, a media server, or gaming server, depending on the type of communication session. For example, a mobile station may engage in a voice call with an endpoint 38 via PSTN 30. Alternatively, a mobile station may engage in a data session with an endpoint via packet data network 34, e.g., for voice-over-packet (VoP) communication, to send or receive e-mail, to browse the World Wide Web, to receive streaming video and/or audio, to participate in Internet gaming, or for other purposes.

A mobile station may use a plurality of wireless links for a communication session with an endpoint. For example, mobile station 18 may be engaged in a communication session with endpoint 38 via PSTN 30 (or with an endpoint via PDN 34) in which mobile station 18 conveys mobile station communications by transmitting reverse link signals and in which wireless network 10 conveys endpoint communications from endpoint 38 by transmitting forward link signals. The mobile station communications and endpoint communications may include voice, data, or other media, depending on the type of communication session.

As represented by forward links 20 and 22 in FIG. 1, wireless network 10 may use forward traffic channels of sectors 14*c* and 12*b* to transmit the forward link signals conveying the endpoint communications. Mobile station 18 may receive the forward link signals represented by forward links 20 and 22 to obtain the endpoint communications. As represented by reverse links 24 and 26 in FIG. 1, wireless network 10 may use sectors 14*c* and 16*a* to receive the reverse link signals transmitted by mobile station 18 and thereby obtain the mobile station communications. Thus, in the configuration illustrated in FIG. 1, sector 14*c* and 16*a* may be in a reverse-active set maintained by BSC 28, and sectors 14*c* and 12*b* may be in a forward-active set maintained by mobile station 18.

3. Exemplary Operation

FIGS. 2-5 are flow charts illustrating exemplary methods of operation. The methods may use a network architecture as shown in FIG. 1. However, other network architectures could be used.

Figure 2:
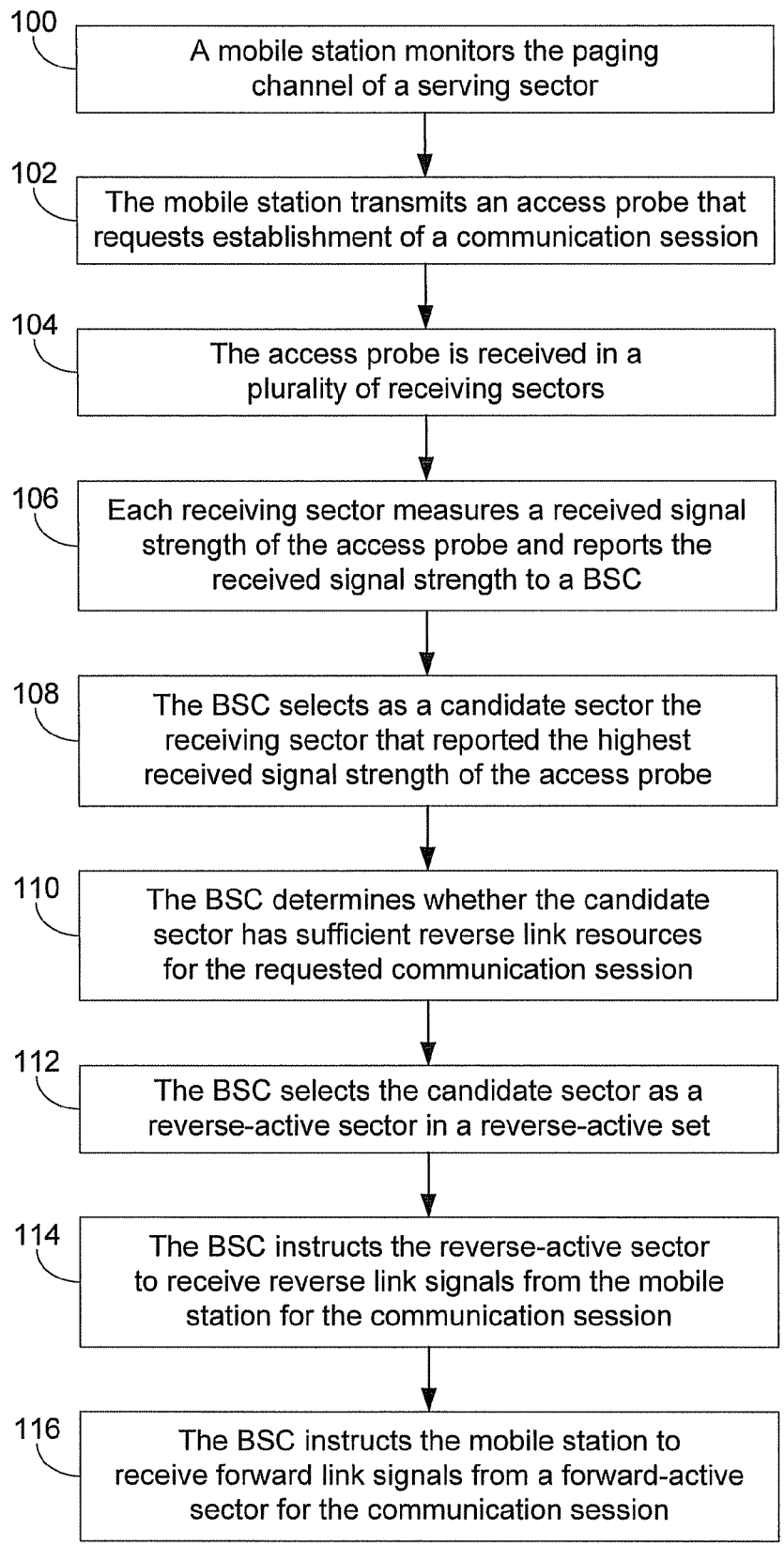
FIG. 2 is a flow chart illustrating a method for establishing a communication session, in accordance with an exemplary embodiment.

FIG. 2 illustrates an example in which a BSC (e.g., BSC 28) populates a reverse-active set when a mobile station (e.g., mobile station 18) requests establishment of a communication session. The process may begin when the mobile station monitors the paging channel of a serving sector, as indicated by block 100. The serving sector could be a sector that the mobile station locked onto after measuring a strongest pilot signal from that sector. For example, with reference to FIG. 1, mobile station 18 may measure the signal strengths of pilot signals transmitted by sectors 14*c*, 16*a*, and 12*b* in order to acquire a serving sector. After measuring the highest pilot signal strength from sector 14*c*, mobile station 18 may begin using sector 14*c* as its serving sector, e.g., by monitoring the paging channel of sector 14*c*.

At some point, the mobile station transmits an access probe that requests establishment of a communication session, as indicated by block 102. The access probe is a signal transmitted in an access channel, e.g., an access channel associated with the mobile station's serving sector. To request establishment of a communication session, the access probe may include an origination request, wherein the mobile station is requesting origination of a communication session with an endpoint, or a termination request, wherein the mobile station is accepting a communication session originated by an endpoint. Alternatively, the access probe could request establishment of a communication session in other ways. The communication session could be a voice call, a data session (e.g., a VoP session, a Web browsing session, or a streaming audio or video session), or some other type of communication session.

The access probe is received in a plurality of receiving sectors, as indicated by block 104. With reference to FIG. 1, the receiving sectors may include, for example, sectors 14*c*, 16*a*, and 12*b*. Each of these receiving sectors measures a respective received signal strength of the access probe and reports the received signal strength to the BSC, as indicated by block 106. For example, BTSs 14, 16, and 12 may measure the signal strengths of the access probe received in sectors 14*c*, 16*a*, and 12*b*, respectively, and report these received signal strengths to BSC 28.

The BSC then selects as a candidate sector (i.e., a candidate for inclusion in a reverse-active set) the receiving sector that reported the highest received signal strength, as indicated by block 108. For example, BSC 28 may compare the received signal strengths reported by sectors 14*c*, 16*a*, and 12*b* and may determine that sector 16*a* reported the highest received signal strength. In that case, BSC 28 would select sector 16*a* as the candidate sector, even though sector 14*c* is the mobile station's serving sector.

The BSC then determines whether the candidate sector has sufficient reverse link resources for the requested communication session, as indicated by block 110. In this regard, each sector may have a maximum number of reverse traffic channels that the sector can receive at a given time. Thus, the BSC may determine whether the candidate sector is already receiving its maximum number (or near its maximum number) of reverse traffic channels to determine whether or not the candidate sector has sufficient reverse link resources to begin receiving another reverse link channel for the request communication session.

In the example illustrated in FIG. 2, the BSC determines that the candidate sector has sufficient reverse link resources. Thus, the BSC selects the candidate sector as a reverse-active sector in a reverse-active set, as indicated by block 112. In other examples, the BSC may determine that the sector reporting the highest received signal strength of the mobile station's access probe (i.e., the candidate sector identified in block 108) lacks sufficient reverse link resources for the requested communication session. In that case, the BSC may instead select the sector reporting the next-highest received signal strength as the reverse-active sector, or the BSC may use other criteria to select the reverse-active sector.

The BSC may create the reverse-active set when the reverse-active sector is selected in block 112. Alternatively, the BSC may have already created the reverse-active set. Initially, the reverse-active set may be populated with only one reverse-active sector, e.g., the sector that reported the highest received signal strength of the mobile station's access probe. Alternatively, the BSC may populate the reverse-active set with additional sectors, such as the mobile station's serving sector and/or other sectors that received the mobile station's access probe.

Once the reverse-active sector is selected, the BSC instructs the reverse-active sector to receive reverse link signals from the mobile station for the communication session, as indicated by block 114. For example, if sector 16a is the reverse-active sector, BSC 28 may transmit an instruction to BTS 16 that instructs BTS 16 to begin receiving reverse link signals from mobile station 18 via sector 16a. The instruction may identify the mobile station and/or the reverse link channel that sector 16a is to use for the communication session.

In addition, the BSC instructs the mobile station to receive forward link signals from a forward-active sector for the communication session, as indicated by block 116. To transmit this instruction, the BSC may use the paging channel from the serving sector that is being monitored by the mobile station. For example, if mobile station 18 has sector 14c as its serving sector, BSC 28 may cause sector 14c to transmit an instruction over the paging channel. The instruction may identify mobile station 18, the forward-active sector, and the forward traffic channel of that sector that mobile station 18 is to use to receive forward link signals. In response to this instruction, the mobile station may tune to the identified forward traffic channel to prepare to receive forward link signals for the communication session. The mobile station may also begin using a reverse traffic channel to transmit reverse link signals for the communication session, and the reverse-active sector in the reverse-active set may begin receiving the reverse link signals from the mobile station for the communication session.

The BSC may select the forward-active sector in various ways. In some implementations, the BSC may select the mobile station's serving sector as the forward-active sector. Alternatively, the BSC may select a sector other than the serving sector as the forward-active sector, for example, if the mobile station has reported receiving a stronger pilot signal from another sector. In addition to signal strengths, the BSC may take into account other factors, such as the availability of forward link resources, when selecting the forward-active sector.

Figure 3:
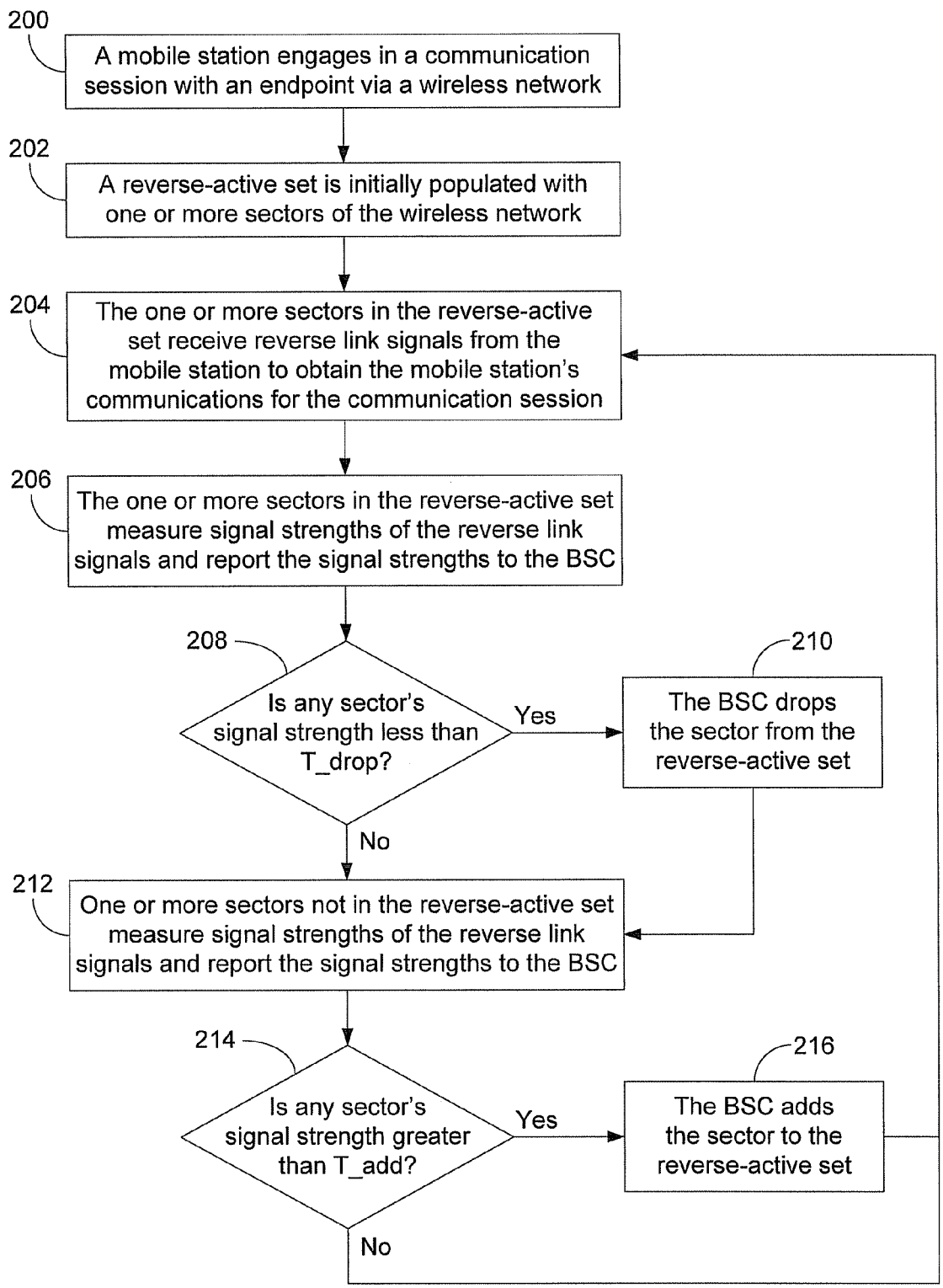
FIG. 3 is a flow chart illustrating a method for maintaining a reverse-active set, in accordance with an exemplary embodiment.

Once a communication session is established and a reverse-active set for the communication session is initially populated, the BSC may maintain the reverse-active set throughout the communication session based, at least in part, on the signal strengths of the mobile station's reverse link signals, as measured in a plurality of relevant sectors. FIG. 3 is a flow illustrating an exemplary method for maintaining a reverse-active set.

The process may begin when a mobile station engages in a communication session with an endpoint via a wireless network, as indicated by block 200. A reverse-active set for the communication session is initially populated with one or more sectors of the wireless network (e.g., using the process illustrated in FIG. 2), as indicated by block 202.

During the communication session, the one or more sectors in the reverse active set receive reverse link signals from the mobile station to obtain the mobile station's communications for the communication session (i.e., communications that are intended for an endpoint), as indicated by block 204. In addition, the one or more sectors in the reverse-active set measure signal strengths of the reverse link signals and report the signal strengths to the BSC, as indicated by block 206. For example, in the configuration illustrated in FIG. 1, sectors 14c and 16a are in the reverse-active set. Thus, sectors 14c and 16a would receive reverse link signals from mobile station 18 to obtain the mobile station's communications for the communication session and would convey the mobile station's communications to BSC 28 for transmission to the endpoint (e.g., endpoint 38). In addition, sectors 14c and 16a would measure the signal strengths of the reverse link signals and report these signal strengths to BSC 28.

BSC 28 then compares the reported signal strengths to a drop threshold (T_drop) to determine whether the signal strength reported by any reverse-active sector is less than T_drop, as indicated by block 208. If there is a sector that reported a signal strength less than T_drop, then the BSC may drop that sector from the reverse-active set, as indicated by block 210. To drop a sector from the reverse-active set, the BSC may instruct a BTS associated with that sector to stop receiving reverse link signals from the mobile station. For example, if BSC 28 determines that sector 16a should be dropped from the reverse-active set, BSC 28 may send BTS 16 a drop instruction that identifies the mobile station and/or the reverse traffic channel being used by the mobile station.

In some cases, the BSC may drop a sector from the reverse-active as soon as that sector reports a signal strength that is below T_drop. In other cases, the BSC may instead start a drop timer in response to an initial report of a signal strength less than T_drop. If the signal strength remains below T_drop when the drop timer expires, then the BSC may drop the sector from the reverse-active set; otherwise, the BSC may keep the sector in the reverse-active set.

In addition to signal strengths, the BSC may take other factors into account when determining whether to drop a sector from the reverse-active set. For example, if there is only one sector in the reverse-active set, the BSC might keep the sector in the reverse-active set even if the sector reports a signal strength that is below T_drop.

One or more sectors that are not in the reverse-active set may also measure signal strengths of the mobile station's reverse link signals and report the signal strengths to the BSC, as indicated by block 212. The sectors that make these signal strength measurements could be selected by the BSC, for example, based on their proximity to the sectors in the reverse-active set. Alternatively, the sectors could be selected in other ways.

BSC 28 then compares the reported signal strengths to an add threshold (T_add) to determine whether any reported signal strength is greater than T_add, as indicated by block 214. If there is a sector that reported a signal strength greater than T_add, then the BSC may add that sector to the reverse-active set, as indicated by block 216. To add a sector to the reverse-active set, the BSC may instruct a BTS associated with that sector to begin receiving reverse link signals from the mobile station. For example, if BSC 28 determines that sector 12b should be added to the reverse-active set, BSC 28 may send BTS 12 an add instruction that identifies the mobile station and/or the reverse traffic channel being used by the mobile station.

Once the BSC has had an opportunity to adjust the reverse-active set, by dropping one or more sectors and/or adding one or more sectors, the process may return to the state indicated by block 204, in which the one or more sectors in the reverse-active set receive reverse link signals from the mobile station to obtain the mobile station's communications for the communication session. In this way, the BSC may endeavor to use for receiving the mobile station's reverse link signals the sectors of the wireless network that receive the reverse link signals with the highest signal strengths, i.e., independently of which sectors are used to transmit forward link signals to the mobile station.

It is to be understood that while the BSC is maintaining the reverse-active set for the communication session, the mobile station may also maintain a forward-active set for the communication session. For example, a forward-active set for a communication session may identify sectors 14c and 12b as forward-active sectors, as indicated in FIG. 1 by forward links 20 and 22. During the communication session, mobile station 18 may measure signal strengths from sectors 14c and 12b in the forward-active set. If the signal strength from either of these sectors falls below a drop threshold, mobile station 18 may report the sector to BSC 28 so that the sector may be dropped from the forward-active set. In addition, mobile station 18 may measure signal strengths from one or more neighboring sectors, such as sector 16a. If the signal strength from sector 16a exceeds an add threshold, mobile station 18 may report the sector to BSC 28 so that sector 16a may be added to the forward-active set. In this way, the forward-active set can be managed independently of the reverse-active set.

Figure 4:
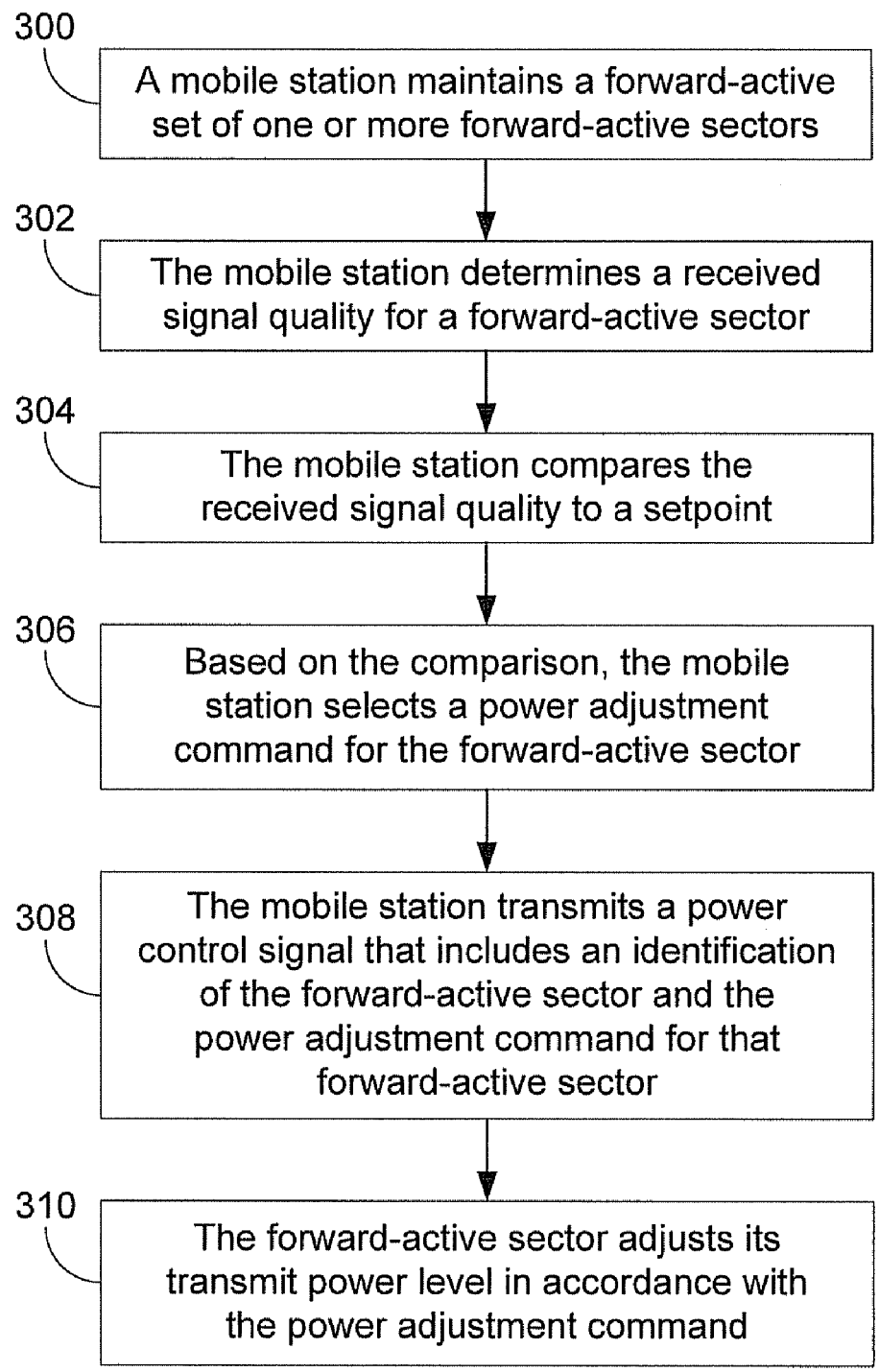
FIG. 4 is a flow chart illustrating a method for forward link power control, in accordance with an exemplary embodiment.
Figure 5:
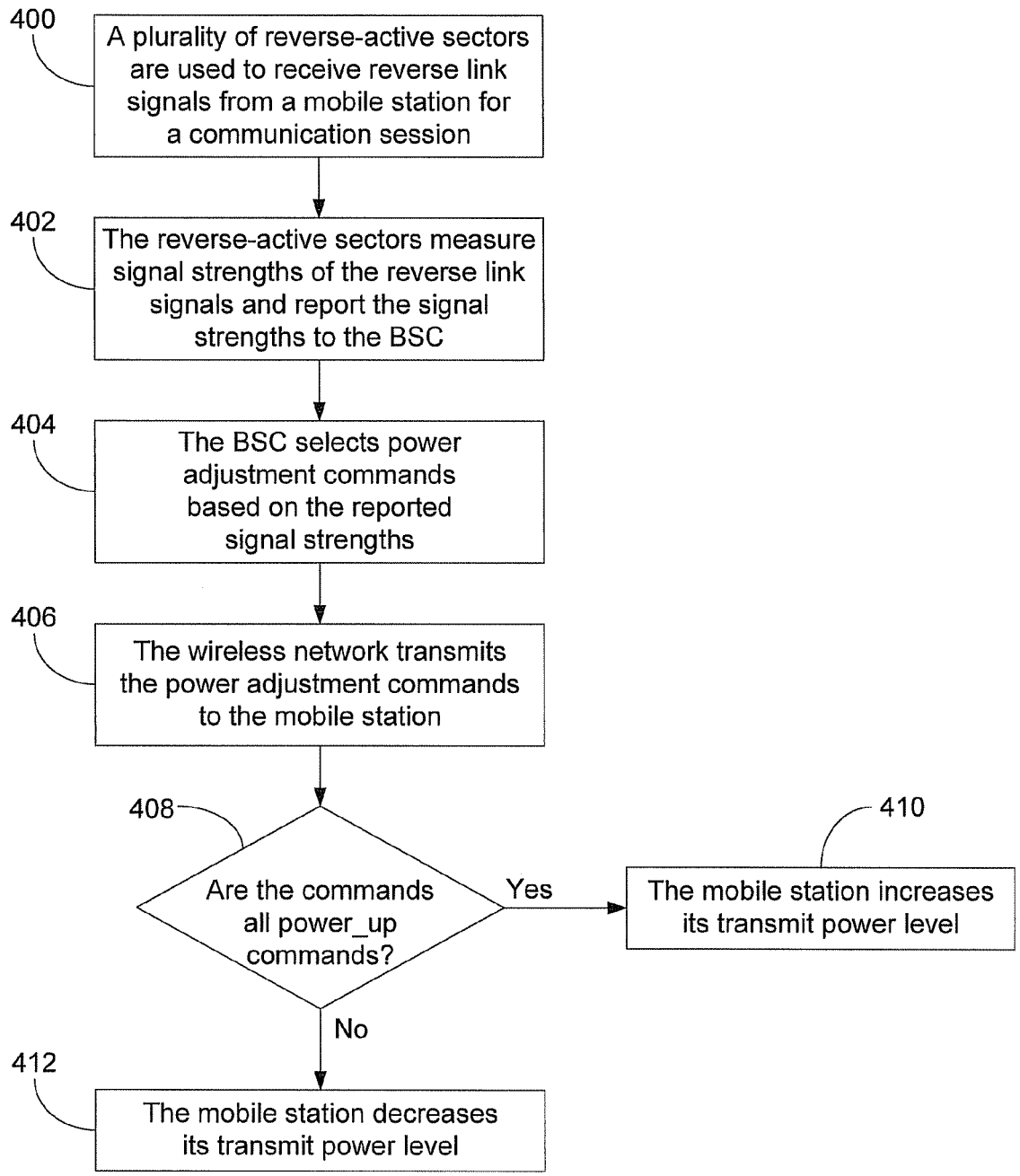
FIG. 5 is a flow chart illustrating a method for reverse link power control, in accordance with an exemplary embodiment.

The forward links and reverse links used for a communication session may be power controlled, as illustrated in FIGS. 4 and 5. FIG. 4 illustrates an exemplary method for forward link power control. In the example of FIG. 4, a mobile station maintains a forward-active set of one or more forward-active sectors for a communication session, as indicated by block 300.

For example, in the configuration illustrated in FIG. 1, mobile station 18 receives forward link signals from sectors 14c and 12b (represented by forward links 20 and 22) and reverse link signals from mobile station are received by sectors 14c and 16a (represented by reverse links 24 and 26). In that case, mobile station 18 may identify sectors 14c and 12b as being in the forward-active set, and BSC 28 may identify sectors 14c and 16a as being in the reverse-active set.

At some point, the mobile station determines a received signal quality of the forward link signals transmitted by a forward-active sector (e.g., sector 12b), as indicated by block 302. For example, the mobile station may periodically determine the received signal quality of each forward-active sector in the forward-active set. The received signal quality could be determined as a signal-to-noise ratio or in terms of other parameters.

The mobile station compares the received signal quality to a setpoint, as indicated by block 304. Based on this comparison, the mobile station selects a power adjustment command for the forward-active sector, as indicated by block 306. The power adjustment command could be for either an upward power adjustment or a downward adjustment. Thus, if the received signal quality is greater than the setpoint, the mobile station may select a downward power adjustment (power_down) command. Conversely, if the received signal quality is less than the setpoint, the mobile station may select an upward power adjustment (power_up) command.

The mobile station then transmits a power control signal that includes an identification of the forward-active sector and the power control command for that forward-active sector, as indicated by block 308. The identification could be a sector identifier, a link identifier, or some other type of identifier. For example, forward link 20 could be identified by the link number "1" and forward link 22 could be identified by the link number "2" in a power control signal. The identification enables the wireless network to determine which forward-active sector a power adjustment command relates to. For example, with sectors 14c and 16a in the reverse-active set, both of these sectors may receive a power control signal transmitted by mobile station 18. However, mobile station 18 may transmit the power control signal in order to adjust the power level of the forward link signals transmitted by sector 12b. Thus, the identification contained in the power control signal enables the wireless network to determine that the power control command relates to sector 12b, even though sectors 14c and 16a received the power control command.

In an exemplary embodiment, the power control signal is a three bit signal, including one power control bit and two identification bits. The power control bit could be either a "0" for a power_up command or a "1" for a power_down command. The two identification bits may correspond to a link number that identifies which forward link is being power controlled.

When the mobile station is trying to control the power levels of multiple forward links (e.g., both forward link 20 and forward 22), the mobile station may concatenate multiple three-bit power control signals together, with one three-bit power control signal for each forward link. Alternatively, the mobile station may transmit different power control signals for different forward links at different times or in different reverse links.

The power control signal is received by the BSC, and the BSC instructs the BTS associated with the identified forward-active sector to adjust the transmit power level used for the forward traffic channel being received by the mobile station. In this way, the forward-active sector adjusts its transmit power level in accordance with the mobile station's power control command, as indicated by block 310.

FIG. 5 illustrates an exemplary method for reverse link power control. In the example of FIG. 5, a plurality of reverse-active sectors (i.e., sectors in a reverse-active set) are used to receive reverse link signals from a mobile station for a communication session, as indicated by block 400.

During the communication session, the reverse-active sectors also measure the signal strengths of the reverse link signals and report the signal strengths to the BSC, as indicated by block 402. The BSC selects power adjustment commands based on the reported signal strengths, as indicated by block 404. For example, the BSC may compare the signal strength reported for each sector to a setpoint to select either an upward power adjustment or a downward power adjustment command for each sector.

The wireless network then transmits the power adjustment commands to the mobile station, as indicated by block 406. The wireless network may use either all of the forward-active sectors or a subset thereof to transmit the power adjustment commands. For example, given the configuration illustrated in FIG. 1, BSC 28 may select respective power adjustment commands for reverse links 24 and 26, based on the signal strengths reported by sectors 14c and 16a, respectively. BSC 28 may then cause these power adjustment commands to be transmitted via forward link 20, via forward link 22, or (redundantly) via both forward link 20 and forward link 22. Alternatively, power adjustment commands for different reverse links may be transmitted via different forward links. For example, BSC 28 may cause the power adjustment commands for reverse link 24 to be transmitted via forward link 20 and the power adjustment commands for reverse link 26 to be transmitted via forward link 22.

The mobile station may determine whether to increase or decrease its transmit power level based on whether the power adjustment commands are all power_up commands, as indicated by block 408. If the commands are all power_up commands, the mobile station increases its transmit power level, as indicated by block 410. Otherwise, the mobile station decreases its transmit power level, as indicated by block 412.

4. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. A method for wireless communication between a wireless network and a mobile station, said method comprising:
   receiving in a plurality of sectors of said wireless network an access probe wirelessly transmitted by said mobile station in an access channel, wherein said access probe requests establishment of a communication session with an endpoint;
   said wireless network measuring a respective received signal strength of said access probe received in each of said plurality of sectors to obtain a plurality of received signal strengths of said access probe;
   said wireless network selecting a reverse-active sector from among said plurality of sectors based, at least in part, on said reverse-active sector's received signal strength of said access probe;
   said wireless network instructing said mobile station to receive forward link signals from a forward-active sector for said communication session; and
   said wireless network instructing said reverse-active sector to receive reverse link signals from said mobile station for said communication session.

2. The method of claim 1, wherein said wireless network selecting a reverse-active sector from among said plurality of sectors based, at least in part, on said reverse-active sector's received signal strength of said access probe comprises:
   a base station controller determining that said reverse-active sector's received signal strength of said access probe is higher than received signal strengths of said access probe for one or more other sectors in said plurality of sectors.

3. The method of claim 1, wherein said wireless network selecting a reverse-active sector from among said plurality of sectors based, at least in part, on said reverse-active sector's received signal strength of said access probe comprises:
   a base station controller comparing said received signal strengths of said access probe to determine a highest received signal strength of said access probe.

4. The method of claim 3, wherein said wireless network selecting a reverse-active sector from among said plurality of sectors based, at least in part, on said reverse-active sector's received signal strength of said access probe further comprises:
   said base station controller determining that a candidate sector in said plurality of sectors received said access probe with said highest received signal strength;
   said base station controller determining that said candidate sector has reverse-link resources available for said communication session; and
   said base station controller selecting said candidate sector as said reverse-active sector.

5. The method of claim 1, wherein said forward-active sector and said reverse-active sector are different sectors of said wireless network.

6. The method of claim 1, further comprising:
   said mobile station monitoring a paging channel of said forward-active sector.

7. The method of claim 6, wherein said wireless network instructing said mobile station to receive forward link signals from a forward-active sector for said communication session comprises:
   said wireless network transmitting an instruction over said paging channel of said forward-active sector.

8. The method of claim 1, wherein said wireless network instructing said reverse-active sector to receive reverse link signals from said mobile station for said communication session, comprises:
   a base station controller transmitting an instruction to a base transceiver system (BTS) associated with said reverse-active sector.

9. The method of claim 8, further comprising:
   said base station controller adding said reverse-active sector to a reverse-active set, wherein said reverse-active set defines which one or more sectors of said wireless network are used to receive reverse link signals from said mobile station for said communication session.

10. The method of claim 1, further comprising:
    a base station controller in said wireless network receiving said plurality of received signal strengths of said access probe.

* * * * *